Patented Feb. 4, 1941

2,230,827

UNITED STATES PATENT OFFICE 2,230,827

MANUFACTURE OF GUANIDINE NITRATE

Robert Burns and Peter Frederick Gay, Ardrossan, Scotland, assignors to Imperial Chemical Industries Limited, a corporation of Great Britain No Drawing. Application November 30, 1938, Serial No. 243,153. In Great Britain December 15, 1937

11 Claims. (Cl. 260—564)

Guanidine nitrate has been produced from calcium cyanamide by an indirect process comprising treatment of the calcium cyanamide with an acid, isolation of the dicyandiamide thus formed, and treatment of the latter with fused ammonium nitrate at about 160° C.

Proposals have also been made for the production of guanidine nitrate by heating calcium cyanamide with ammonium nitrate. According to one of these proposals, calcium cyanamide is added to molten ammonium nitrate and the mixture is heated to 200–220° C.

According to another proposal, commercial calcium or sodium cyanamide is mixed with dry ammonium nitrate and the mixture is heated to a much lower temperature, not exceeding 110°–120° C. Yields exceeding 90% of the theoretical are said to be obtained by this process. According to a modification of the same process, the mixture of commercial sodium or calcium cyanamide and dry ammonium nitrate is not immediately heated, but is first allowed to react spontaneously, and is thereafter warmed to a temperature not exceeding 90°–100° C. until the reaction is completed. The occurrence of an initial spontaneous reaction is attributed to the presence of free alkali in commercial sodium or calcium cyanamide. Ammonia liberated from the ammonium nitrate by the free alkali is absorbed in the excess of ammonium nitrate with evolution of heat, forming Diver's liquid and causing liquefaction of the reaction mixture so that the constituents thereof are brought into more intimate contact.

The isolation of the guanidine nitrate produced according to the proposed methods is effected by adding sufficient water to dissolve the melt, filtering off insoluble matter (including the considerable proportion of carbon present where commercial calcium cyanamide has been used) and evaporating the solution, which may be neutralised, until it is sufficiently concentrated to deposit crystalline guanidine nitrate on cooling. Alternatively, ammonium bicarbonate, sulphate, or phosphate may be added to the solution, or to the melt immediately before extraction with water, to precipitate the soluble calcium salts present.

As is well known, fused ammonium nitrate is capable of undergoing an exothermic decomposition which in presence of carbonaceous combustible materials may become uncontrollably violent, and in certain circumstances may cause a detonation of the mass. On this account any operation involving the addition of material containing a considerable proportion of free carbon, such as commercial calcium cyanamide, to fused ammonium nitrate must be considered a dangerous operation. The later proposals for the production of guanidine nitrate at temperatures not exceeding 120° C. avoid this disadvantage to some extent; but the progress of the reaction at these relatively low temperatures is dependent on a sufficient initial alkalinity of the sodium or calcium cyanamide used.

A further suggested method is to fuse together calcium cyanamide and ammonium nitrate in the presence of water at a temperature between 110° and 170° C. Unless this process is carried out with pure calcium cyanamide, which involves the cost of purification, this method is also attended with danger of the decomposition of the ammonium nitrate, particularly as it is difficult to control the rate of the reaction when the whole of the ingredients are present together.

This invention has as an object to devise a safe and economical method of manufacturing guanidine nitrate from calcium cyanamide and ammonium nitrate. A further object is to devise such a method that will have greater efficiency than known methods. A further object is to devise such a method in which the reaction can be controlled. Further objects will appear hereinafter. These objects are accomplished by the following invention.

We have found that we can manufacture guanidine nitrate with greater efficiency and avoid the dangers of the earlier methods if we add at least sufficient water to the ammonium nitrate to liquefy it at a desired reaction temperature, and heat the mixture to a temperature at which the reaction can proceed, and than add a cyanamide salt. The vigour of the reaction may be controlled by varying the time that elapses between the addition of successive portions of cyanamide salt charge and/or the rate at which the cyanamide salt is introduced, as well as by controlling the temperature to which the reaction vessel is heated. The reaction takes place appreciably if the temperature of the aqueous ammonium nitrate mixture is not below about 65° C., but in general it is desirable to carry out the reaction at a somewhat higher temperature, for instance not below 90° C.

In putting the invention into effect, we prefer to add to the ammonium nitrate used a substantial proportion of its weight of water; e. g. from 30%–60%, and preferably about 50% of the weight of ammonium nitrate. The mixture is warmed to a suitable temperature, e. g. 110–130°

C., and the calculated amount of cyanamide salt is added in portions with stirring. The temperature may be allowed to drop to about 100° C. towards the end of the reaction. The melt may be extracted and treated in known manner for the recovery of the guanidine nitrate; to obtain a product of a high degree of purity we prefer to precipitate the soluble calcium salts as far as possible with the addition of the correct proportion of ammonium sulphate, thereafter precipitating the residual calcium from solution with the calculated amount of ammonium carbonate. In this way the whole of the nitrogen is recoverable for re-use in a subsequent preparation.

The following example illustrates the invention.

The apparatus used consists of a closed vessel provided with means for mechanically stirring the contents, a closed inlet through which the reagents may be added, and a fume pipe leading to a trap in which evolved ammonia is caught in an acid solution. The vessel is jacketted or externally heated so that the contents may be heated to 110°–130° C. if necessary.

600 gms. ammonium nitrate and 300 gms. water are added to the vessel and heated to boiling by means of a jacket providing an external temperature of about 125° C., at which temperature a homogeneous solution is formed. 320 gms. of 70% nitric acid, diluted with an equal volume of water, are placed in the fume trap. The stirrer is now started and 200 gms. commercial calcium cyanamide (containing 20% available nitrogen) are added in small quantities over a period of two hours, during which period the temperature is allowed to drop gradually to about 100° C. The reaction mixture is now heated for a further period of two hours at 100°–105° C. At this stage the temperature is allowed to drop to 90°–95° C. and the contents of the ammonia trap are gradually added to the reaction mixture; care being taken to avoid loss by frothing. The reaction mixture is now diluted with 500 ml. boiling water and filtered hot, the insoluble carbonaceous residue is well washed with boiling water, and the washings are added to the filtrate. The calcium content of the combined filtrate and wash liquor is determined volumetrically, and the calculated proportion of ammonium sulphate is added to precipitate the calcium as sulphate, which is filtered off at 80°–90° C. The residual calcium content is removed by addition of solid ammonium carbonate at a temperature not below 70° C. After removal of the precipitated calcium carbonate the filtrate is evaporated down, under reduced pressure, to a volume of about 750 ml.; when, on cooling, guanidine nitrate crystallises out. The total yield is about 160–170 gms. (about 90%–93% of theory), of which about 110–120 gms. are obtained in crystalline form. The mother liquor is worked up for use in a succeeding preparation by being evaporated down until the temperature of the fused material reaches 160° C. to convert any biguanide nitrate present into guanidine nitrate. The fused mass, which weighs about 850–900 gms. and contains about 50 gms. guanidine nitrate, is broken up for use in a subsequent batch.

As stated above the preferred quantity of water added to the ammonium nitrate lies between 30% and 60% but essentially there should be sufficient water to liquefy the ammonium nitrate at the desired reaction temperature but not sufficient to give a solution with a boiling point near or below the reaction temperature. Thus if the reaction is to be carried out at 130° we must have at least 4% of water in the ammonium nitrate solution and if the temperature is to be allowed to fall to 100° C. 9% will be necessary. The maximum proportion of water for this reaction temperature is not critical as the reaction will probably take place in almost any dilution, so that quantities of 100% of the weight of ammonium nitrate, and more, could be used.

Although we prefer to operate at a temperature between 110° C. and 130° C. a wider range namely 90° C. to 130° C. can be employed.

The proportion of ammonium nitrate to calcium cyanamide is not critical but we have obtained the best results by using at least 3 molecular proportions of ammonium nitrate for each molecular proportion of cyanamide radical found by assay in the calcium cyanamide. Instead of the calcium cyanamide used in the above example we could have used any cyanamide salt such as barium cyanamide. Sodium cyanamide may also be used for the purposes of the invention, but in this case it is necessary to crystallise out the guanidine nitrate from the filtered and concentrated mother liquor.

This invention is a valuable advance in the art as we can by its use make guanidine nitrate directly from inexpensive materials; at no time during the course of the reaction does any large quantity of cyanamide salt come in contact with substantially undiluted fused ammonium nitrate, so that the danger of exothermic decomposition is obviated; the liquefaction of the mixture is effected by the water present and is not due to Diver's liquid, so that the efficiency of the reaction is not dependent on the presence of free alkali in the cyanamide salt used; and the cyanamide salt can be added in small portions to a well agitated, heated and liquefied ammonium nitrate, so that the violence of the reaction can be effectively controlled.

As many apparently widely different embodiments of this invention may be made without departing from the spirit and scope thereof it is to be understood that the invention is not limited to the specific embodiments thereof, except as defined in the appended claims.

We claim:

1. A process for the manufacture of guanidine nitrate which comprises adding to ammonium nitrate sufficient water to liquefy the ammonium nitrate at a given reaction temperature between 65 and 130° C., the quantity of water added being at least 30 per cent by weight of the ammonium nitrate used, heating the ammonium nitrate to said given reaction temperature and then adding the cyanamide salt selected from the group consisting of salts of the alkali and alkaline earth metals.

2. A process as claimed in claim 1 in which the violence of the reaction is controlled by means of the rate of addition of the commercial cyanamide salt to the liquefied ammonium nitrate.

3. A process as claimed in claim 1 in which the liquefied ammonium nitrate is agitated during the addition of the commercial cyanamide salt.

4. A process as claimed in claim 1 in which the desired reaction temperature lies between 90° C. and 130° C.

5. A process as claimed in claim 1 in which three molecular proportions of ammonium nitrate are used for each molecular proportion of cyanamide radical.

6. A process as claimed in claim 1 in which the cyanamide salt is commercial calcium cyanamide.

7. A process for the manufacture of guanidine nitrate which comprises adding to ammonium nitrate sufficient water to liquefy the ammonium nitrate at a given reaction temperature between 65 and 130° C., the quantity of water added being at least 30 per cent by weight of the ammonium nitrate used, heating the ammonium nitrate to said given reaction temperature and then adding commercial calcium cyanamide, diluting the melt with boiling water, adding a quantity of ammonium sulphate sufficient to precipitate the bulk of the calcium, removing the precipitated calcium sulphate, precipitating the residual calcium content by the addition of ammonium carbonate, removing the calcium carbonate, concentrating the remainder under reduced pressure until the guanidine nitrate crystallises from the cooled solution, removing the guanidine nitrate, concentrating the mother liquor by heat to reconvert any biguanide nitrate into guanidine nitrate, and reworking the concentrate in a subsequent batch.

8. The process for the manufacture of guanidine nitrate which comprises treating a given amount of ammonium nitrate with sufficient water to liquefy the same at a selected reaction temperature within the range of from 90 to 130° C., the quantity of water added being at least 30 per cent by weight of the ammonium nitrate used, heating said wet ammonium nitrate to said selected temperature and adding a commercial cyanamide salt selected from the group consisting of the salts of the alkali and alkaline earth metals.

9. The process for the manufacture of guanidine nitrate which comprises treating a given amount of ammonium nitrate with at least sufficient water to liquefy it at a given reaction temperature between 65 and 130° C., the quantity of water added being at least 30 per cent by weight of the ammonium nitrate used, heating the mixture to said given temperature at which the reaction can proceed, and adding to the mixture over a period of time, a commercial cyanamide salt selected from the group consisting of the salts of the alkali and alkaline earth metals.

10. The process for the manufacture of guanidine nitrate which comprises treating a given amount of ammonium nitrate with sufficient water to liquefy the same at a selected reaction temperature at the range of from 90° to 130° C., the quantity of water added being at least 30 per cent by weight of the ammonium nitrate used, heating the mixture to a temperature lower than the selected reaction temperature but above 65° C., and adding thereto over a period of time, a commercial cyanamide salt selected from the group consisting of the salts of the alkali and alkaline earth metals and controlling the vigour of the reaction so that the reaction proceeds at the selected reaction temperature.

11. The process for the manufacture of guanidine nitrate which consists in adding under rising temperature conditions a commercial cyanamide salt selected from the group consisting of the salts of the alkali and alkaline earth metals, to a mixture of ammonium nitrate and at least 30 per cent by weight of water at a temperature between 65 and 130° C., until the temperature has risen to a given reaction temperature, continuing the addition of the cyanamide salt over a period of time and controlling the vigour of the reaction so that a given reaction temperature is maintained, the amount of water used being at least sufficient at the given reaction temperature to dissolve the whole of the ammonium nitrate used.

ROBERT BURNS.
PETER FREDERICK GAY.